(12) United States Patent
Grotjohn et al.

(10) Patent No.: US 7,664,755 B2
(45) Date of Patent: Feb. 16, 2010

(54) USER PROMPT FOR LOADING SOUND IN A COMPUTER RESOURCE

(75) Inventors: David Kirk Grotjohn, Cary, NC (US); Steven Michael Miller, Cary, NC (US); Laura Lee Girolami-Rose, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/211,004

(22) Filed: Aug. 24, 2005

(65) Prior Publication Data

US 2007/0055683 A1 Mar. 8, 2007

(51) Int. Cl.
*G06F 17/30* (2006.01)
(52) U.S. Cl. .......................... 707/10; 709/206
(58) Field of Classification Search ........................ None
See application file for complete search history.

(56) References Cited

U.S. PATENT DOCUMENTS

| | | | |
|---|---|---|---|
| 6,128,263 A | 10/2000 | Fujii et al. | |
| 6,307,482 B1 * | 10/2001 | Le Bel | 340/691.8 |
| 6,321,278 B1 * | 11/2001 | Phu et al. | 710/14 |
| 6,359,987 B1 | 3/2002 | Tran et al. | |
| 6,427,136 B2 | 7/2002 | Obitsu | |
| 6,690,291 B1 * | 2/2004 | Cardillo et al. | 340/901 |
| 6,839,416 B1 * | 1/2005 | Shaffer | 709/204 |
| 6,938,152 B2 * | 8/2005 | Shin et al. | 713/2 |
| 7,058,036 B1 * | 6/2006 | Yu et al. | 709/206 |
| 2001/0039561 A1 | 11/2001 | Cho | |
| 2002/0123929 A1 * | 9/2002 | Speicher | 705/14 |
| 2002/0138280 A1 | 9/2002 | Drabo | |
| 2003/0217038 A1 * | 11/2003 | Kageyama et al. | 707/1 |
| 2004/0032934 A1 * | 2/2004 | Malik | 379/88.16 |
| 2004/0117839 A1 * | 6/2004 | Watson et al. | 725/87 |
| 2005/0004873 A1 * | 1/2005 | Pou et al. | 705/51 |
| 2005/0071167 A1 * | 3/2005 | Levin et al. | 704/272 |
| 2005/0119936 A1 * | 6/2005 | Buchanan et al. | 705/14 |
| 2005/0267944 A1 * | 12/2005 | Little | 709/207 |
| 2006/0126807 A1 * | 6/2006 | Weil | 379/101.01 |

* cited by examiner

*Primary Examiner*—Tim T. Vo
*Assistant Examiner*—Jau-Shya Meng
(74) *Attorney, Agent, or Firm*—Joseph E. Bracken; Law Office of Jim Boice

(57) ABSTRACT

A method, apparatus and computer-usable medium for transmitting a computer resource to a computing device, wherein the computer resource includes at least one audio content. A visual display is presented, on the computing device, that offers options to accept and receive the computer resource with or without the at least one audio content.

11 Claims, 13 Drawing Sheets

USER PROMPT FOR LOADING SOUND IN A COMPUTER RESOURCE

BACKGROUND OF THE INVENTION

The present invention relates in general to the field of computers and similar technologies, and in particular to software utilized in this field.

Many computer resources (e.g., software) have sound embedded in them. The sound often begins playing immediately when the computer resource is loaded. This is especially typical in computer resources such as web pages, e-mail messages, and other web-related resources. It is also common in local resources (e.g., videos, presentation files, help programs, etc.).

SUMMARY OF THE INVENTION

The present invention includes, but is not limited to, a method, apparatus and computer-usable medium for transmitting a computer resource to a computing device, wherein the computer resource includes at least one audio content. A visual display is presented, on the computing device, that offers options to accept and receive the computer resource with or without the at least one audio content.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
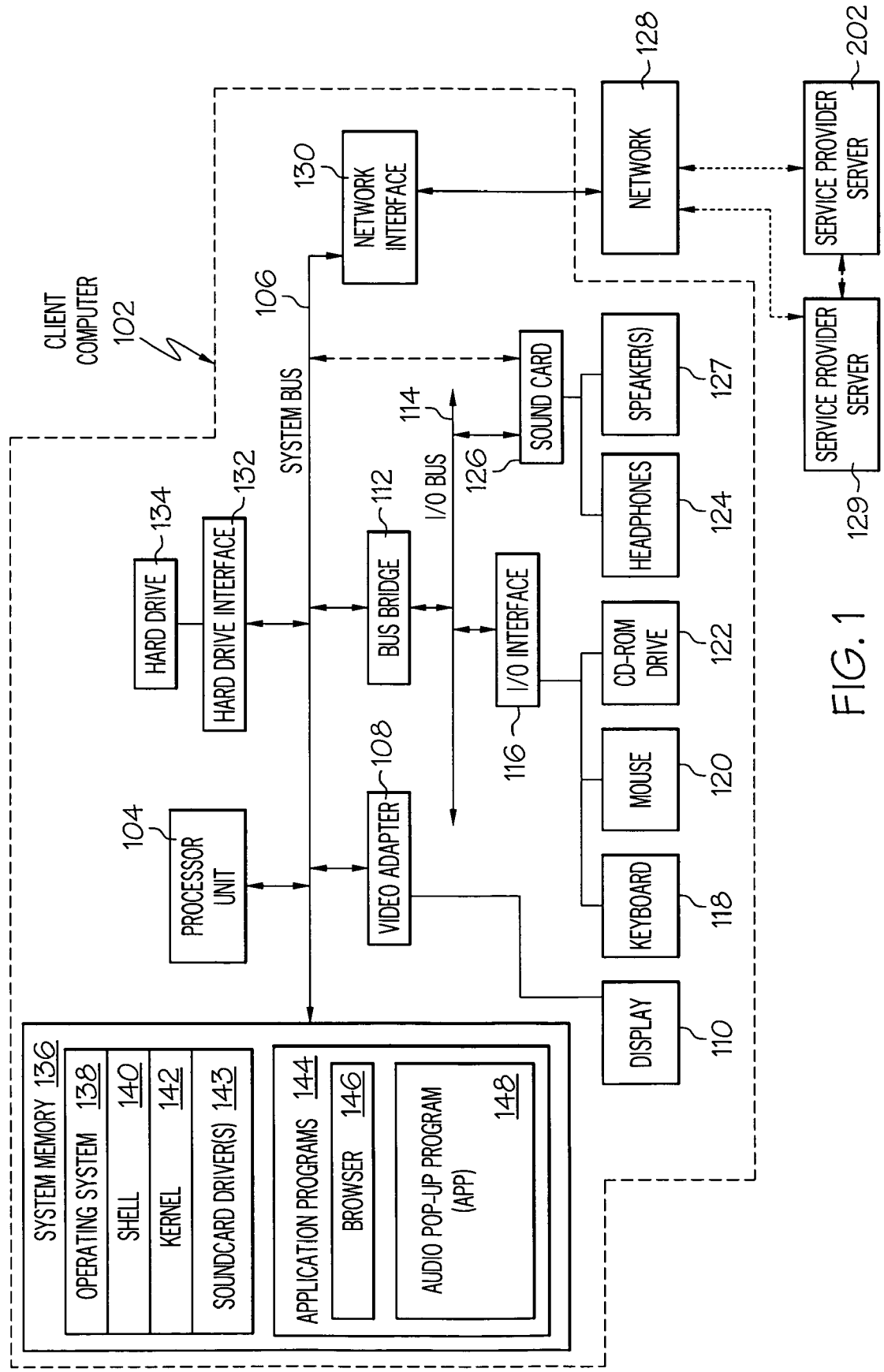
FIG. 1 illustrates an exemplary computer in which the present invention may be implemented.

With reference now to the figures, and in particular to FIG. 1, there is depicted a block diagram of an exemplary client computer 102, in which the present invention may be utilized. Client computer 102 includes a processor unit 104 coupled to a system bus 106. Also coupled to system bus 106 is a video adapter 108, which drives/supports a display 110. System bus 106 is coupled via a bus bridge 112 to an Input/Output (I/O) bus 114. Coupled to P/O bus 114 is an I/O interface 116, which affords communication with various I/O devices, including a keyboard 118, a mouse 120, and a Compact Disk-Read Only Memory (CD-ROM) drive 122. The format of the ports connected to I/O interface 116 may be any known to those skilled in the art of computer architecture, including but not limited to Universal Serial Bus (USB) ports.

Client computer 102 is able to communicate with a service provider server 202 and/or a target computer 129 via a network 128 using a network interface 130, which is coupled to system bus 106. Preferably, network 128 is the Internet.

A sound card 126 is coupled (preferably) to I/O bus 114. Alternatively, sound card 126 may be coupled to system bus 106. Within sound card 126 are hardware and firmware (not shown) needed to utilize sound card driver(s) 143 that drive headphones 124 and/or loudspeaker(s) 127. As the dotted lines between sound card 126 and speakers/headphones 127/124 suggest, preferably sound card 126 does not drive speakers 127 if sound card 126 detects that headphones 124 are plugged into a receptacle (not shown) supported by sound card 126. In a preferred embodiment, drivers 143 for sound card 126 are part of operating system 138, although these drivers may be add-on programs found within application programs 144.

Also coupled to system bus 106 is a hard drive interface 132, which interfaces with a hard drive 134. In a preferred embodiment, hard drive 134 populates a system memory 136, which is also coupled to system bus 106. Data that populates system memory 136 includes client computer 102's operating system (OS) 138, which further includes a shell 140, for providing transparent user access to resources such as application programs 144, which include a browser 146. OS 138 also includes a kernel 142, which includes lower levels of functionality for OS 138, including providing essential services required by other parts of OS 138 and application programs 144, including memory management, process and task management, disk management, and (preferably) mouse and keyboard management.

As is well known in the art, a command interpreter or "shell" is generally a program that provides an interpreter and interfaces between the user and the operating system. More specifically, a shell program executes commands that are entered into a command line user interface or from a file.

The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g. a kernel 242) for processing.

Client computer 102's system memory also includes an Audio Pop-up Program (APP) 148. APP 148 includes code for presenting a visual display, such as shown below in FIG. 3b, to preemptively accept or reject an audio file that is part of a computer resource being downloaded by/transmitted to a target computer 129, and software required to 1) block the audio file from being downloaded; 2) allow the audio file to be downloaded but temporarily disabled; or 3) allow the audio file to be downloaded but causing sound card 126 to be temporarily disabled whenever the downloaded resource is running.

Client computer 102 is thus able to download a computer resource (not shown) to target computer 129, either directly or via service provider server 202. Client computer 102 is also able to download, preferably from service provider server 202, APP 148 for controlling whether audio files are included/active in the computer resource being downloaded. Note that APP 148 may be embedded within the downloaded computer resource, or it may be a stand-alone program.

The hardware elements depicted in client computer 102 are not intended to be exhaustive, but rather are representative to highlight essential components required by the present invention. For instance, client computer 102 may include alternate memory storage devices such as floppy disk drives, magnetic cassettes, Digital Versatile Disks (DVDs), Bernoulli cartridges, and the like. These and other variations are intended to be within the spirit and scope of the present invention.

Note that the elements described above for client computer 102 may also be used as a template for the elements used by target computer 129.

Figure 2:
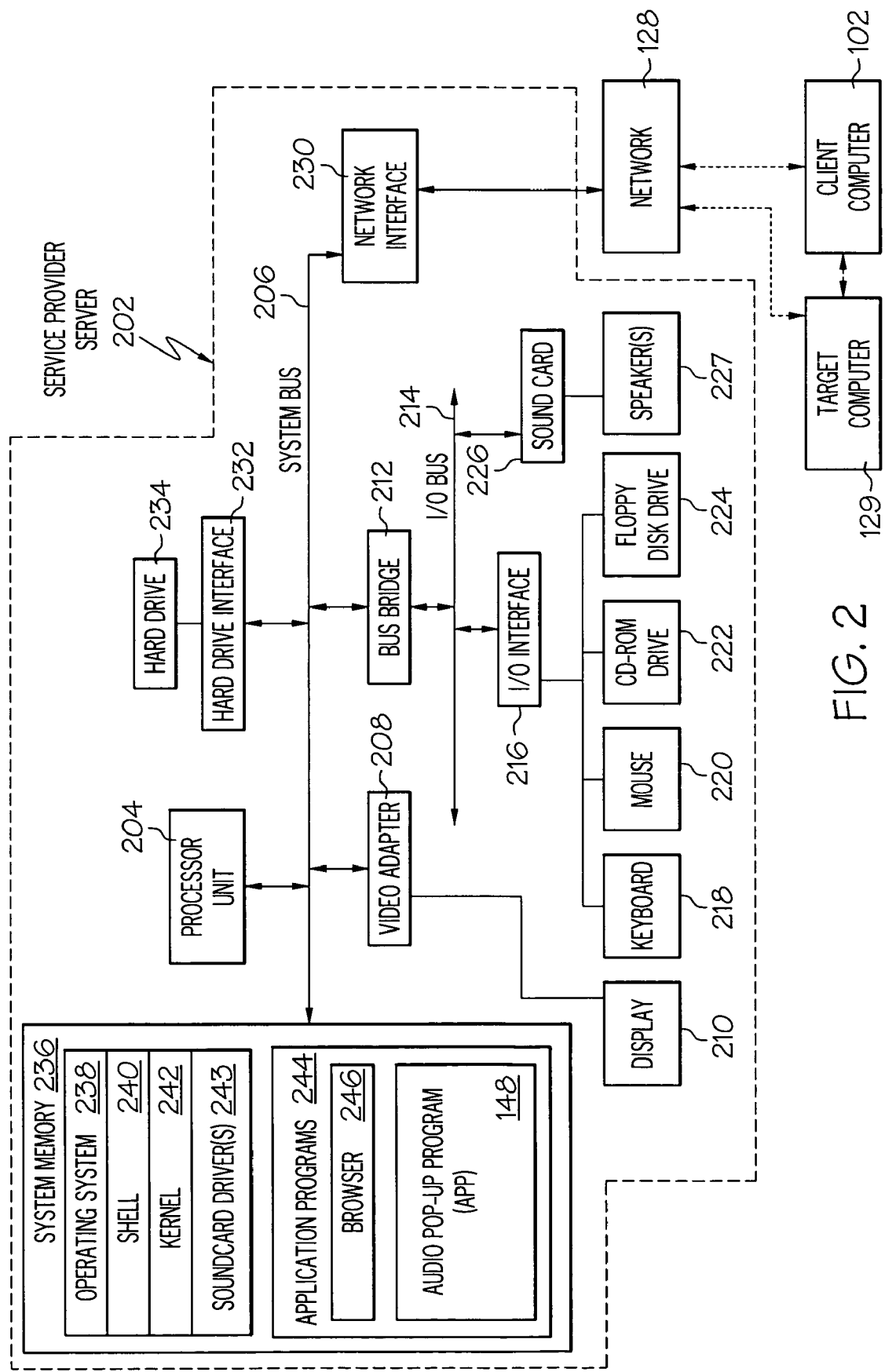
FIG. 2 depicts an exemplary server from which software for executing the present invention may be deployed.

With reference now to FIG. 2, there is depicted a block diagram of an exemplary service provider server 202 that can be used to re-transmit (pass on) a computer resource from client computer 102 to target computer 129, and/or to send to a client computer 102 the APP program 148, which performs the functions described above. Service provider server 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) drive 222, and a floppy disk drive 224. The format of the ports connected to I/O interface 216 may be any known to those skilled in the art of computer architecture, including but not limited to Universal Serial Bus (USB) ports.

Service provider server 202 is able to communicate with client computer 102 and/or target computer 129 via network 128 using a network interface 230, which is coupled to system bus 206.

Also coupled to system bus 206 is a hard drive interface 232, which interfaces with a hard drive 234. In a preferred embodiment, hard drive 234 populates a system memory 236, which is also coupled to system bus 206. Data that populates system memory 236 includes service provider server 202's operating system 238, which includes a command interpreter program known as a shell 240, which is incorporated in a higher level operating system layer and utilized for providing transparent user access to resources such as application programs 244, which include a browser 246, and a copy of APP 148 described above.

OS 238 also includes sound card driver(s) 243, which may be the same sound card driver(s) 143 needed by client computer 102 and/or target computer 129. Sound card driver(s) 243 may be downloaded from service provider server 202 to client computer 102 and/or target computer 129. Optionally, sound card driver(s) 243 may also be used to enable sound card 226 for driving local speaker(s) 227 in service provider server 202.

Exemplary application programs 244 used in the present invention are web browser 246 and APP program 148 described above. Web browser 246 includes program modules and instructions enabling a World Wide Web (WWW) client (i.e., client computer 102 and/or target computer 129) to send and receive network messages to the Internet using HyperText Transfer Protocol (HTTP) messaging. Note again that APP 148 is used in performing some or all of the steps described below in FIG. 3, as well as Graphical User Interfaces (GUIs) used in the present invention.

The hardware elements depicted in service provider server 202 are not intended to be exhaustive, but rather are representative to highlight essential components required by the present invention. For instance, service provider server 202 may include alternate memory storage devices such as flash drives, magnetic cassettes, Digital Versatile Disks (DVDs), Bernoulli cartridges, and the like. These and other variations are intended to be within the spirit and scope of the present invention.

Figure 3A:
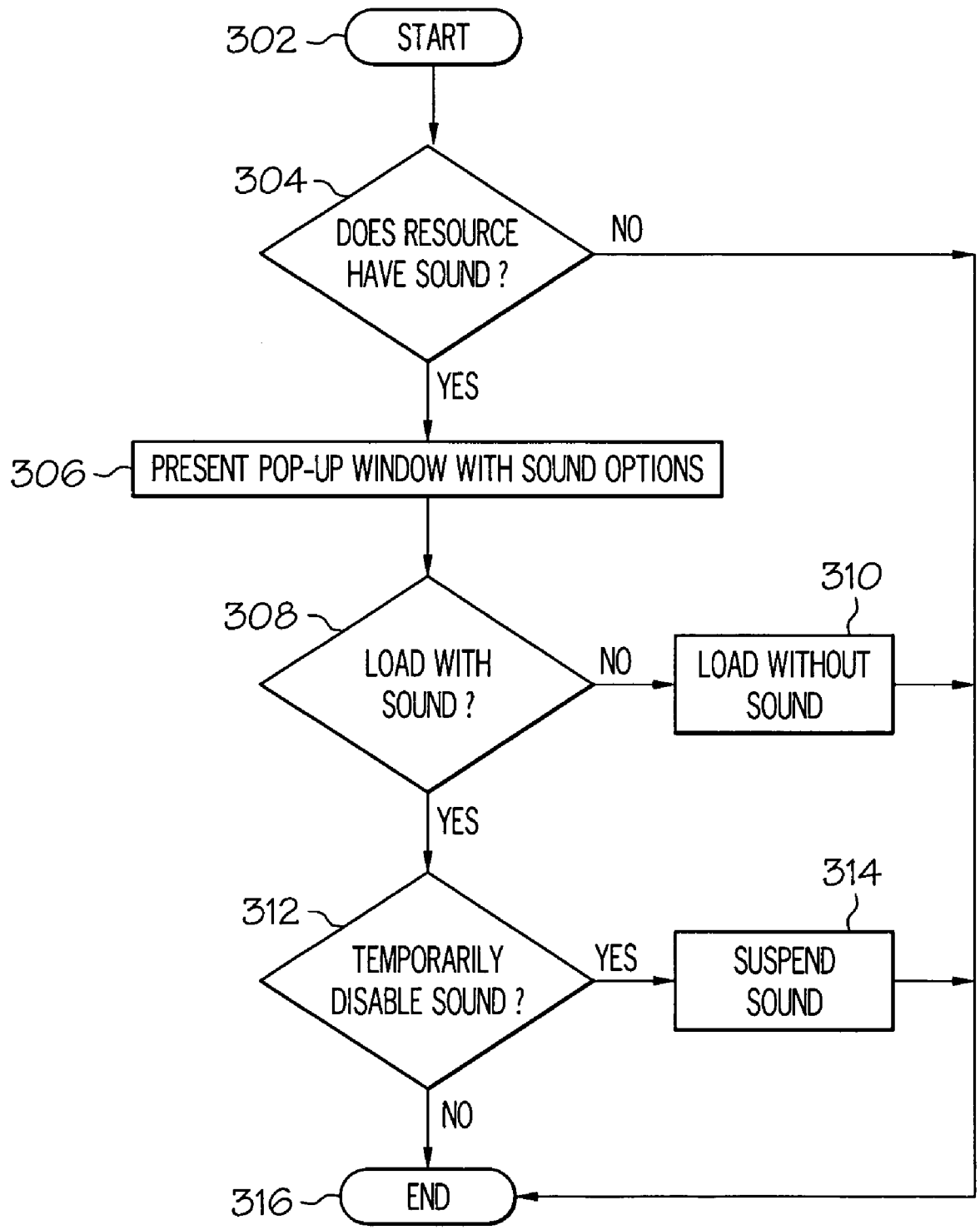
FIG. 3a is a flow-chart of exemplary steps taken by the present invention to present a user sound options for a computer resource.

Referring now to FIG. 3a, a flow-chart of exemplary steps taken by the present invention is presented. After initiator block 302, a query is made as to whether a computer resource that is being transmitted to a computer has sound file(s) associated with it (query block 304). This computer resource is preferably a web-based resource such as, but not limited to, a web page, an e-mail message, an Instant Messenger (IM) message, etc., but may be a local resource (e.g., video, a presentation file, help programs, etc.).

The computer resource may be transmitted to target computer 129 (shown in FIGS. 1-2) either directly from client computer 102, or via service provider server. 202, which may append or embed software (e.g., APP 148) needed to allow a user of target computer 129 to accept (conditionally or unconditionally) or reject some or all audio files associated with the transmitted computer resource.

If the computer resource does not have any audio capability (e.g., has no audio files), then the process ends (terminator block 316). However, if the computer resource does include audio file(s) or other embedded audio information, then APP 148 or its equivalent generates a pop-up window (or an icon on the target computer web browser display) presenting the user with options (block 306), such as shown in Graphical User Interface (GUI) 318 shown in FIG. 3b. Note that the embedded audio information may be embedded directly, or it may be a referred link to another audio source such as a streaming media source point. Thus, referenced to "audio files" are understood to apply to such other audio sources as well as locally stored files. Similarly, the term "audio content" is defined herein as an audio file, a streaming content, or any other similar audio source, unless described otherwise or more specifically in the claim.

Figure 3B:
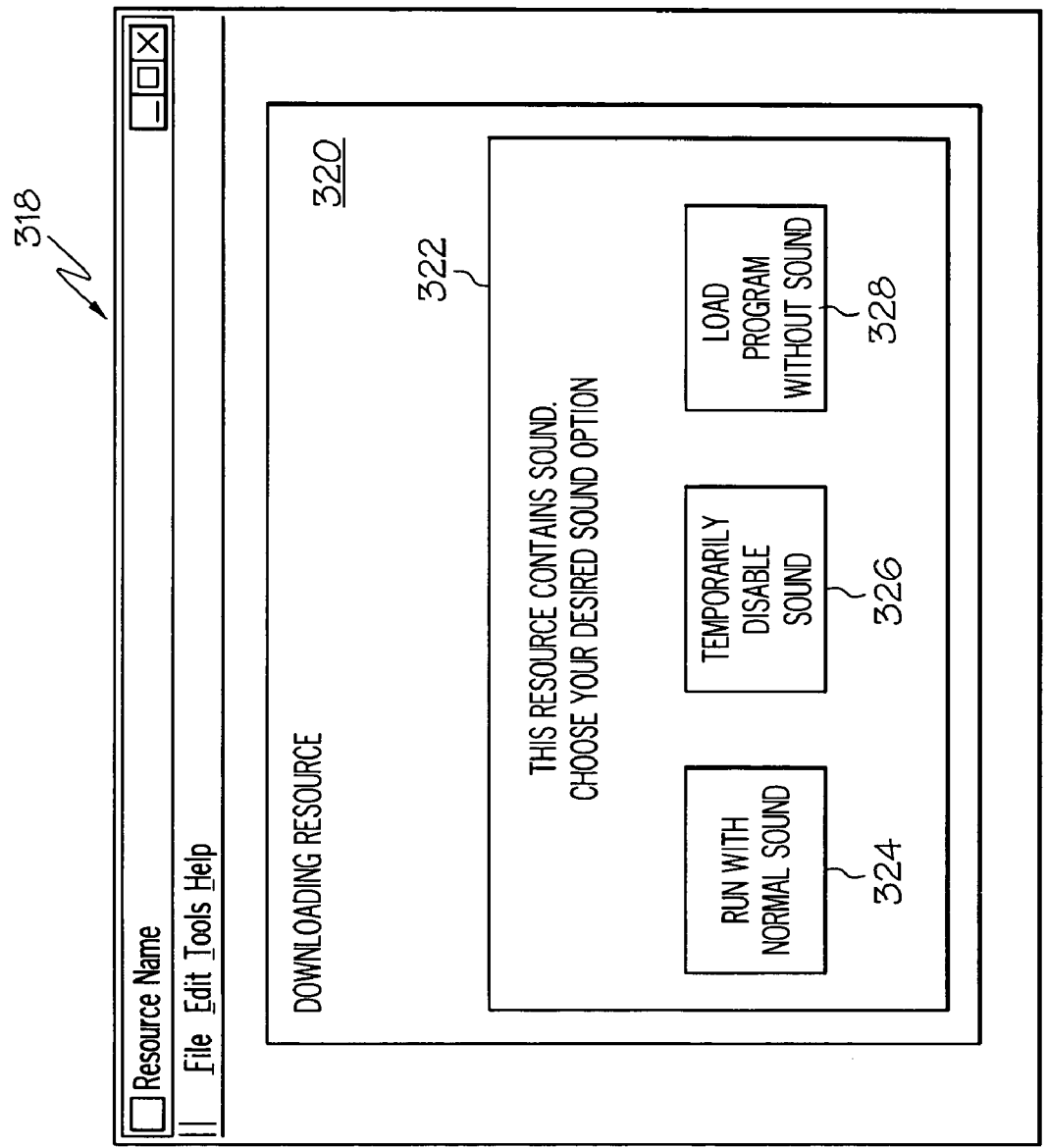
FIG. 3b depicts a Graphical User Interface (GUI) that present different sound options to the user.

Referring then to FIG. 3b, the downloading computer resource includes a window 320, which contains a sub-window 322. Within sub-window 322 are three "hot buttons" 324, 326, and 328.

Clicking button 324 allows the user to download the audio files with the resource, affording full audio capability (subject to compatibility with the audio system of the target computer).

Clicking button 326 allows the user to download the audio files (or other audio source, such as streaming content) with the resource, but temporarily silences the audio portion of the resource, either by disabling the sound card or the audio files, while the resource is running. The user can then re-activate the sound (by re-enabling the sound card or removing the restrictions on the audio files) at a later time, such as after adjusting sound levels on her machine downward, plugging in headphones to cause loudspeakers to be disabled, etc. Preferably, such subsequent re-enablement of the audio portion of the resource is via a button that is part of the downloaded resource, or is a button on a web browser.

Clicking button 328 loads the resource without sound (e.g., accepts the e-mail but rejects audio attachments such as a WAV audio file). By clicking button 328, the user can never hear the audio portion of the resource unless she is re-offered the resource and chooses either button 324 or 326.

Returning to FIG. 3a, the resource can be loaded with or without sound (query block 308 and block 310). If loaded with sound, the sound can be temporarily disabled/suspended (query block 312 and block 314). Note that the sound can be disabled/suspended either locally at target computer 129 by clicking button 326 or 328 shown in FIG. 3b, or the sound can be disabled/suspended remotely, preferably by the client computer 102 and/or the service provider server 202 that are sending the computer resource. That is, the sending (transmitting) computer can send the computer resource with or without the sound feature, depending on which button (324, 326, 328) is clicked at the target computer 129, and the sending computer can remotely temporarily disable the audio content (sound feature), either by disabling the software code that enables the sound, or by remotely disabling a sound card in the receiving computer.

Note that while the preemptive disabling of sound has been described with respect to web resources and other applications, such disablement can also be done with respect to the operating system itself. That is, the kernel 142 in OS 138 often contains an audio file that plays a distinctive sound when the computer is booting up. In an alternative embodiment of the present invention, a pop-up window can also be generated using APP 148 type code embedded within OS 138. Such code is preferably structured to be read after mouse, keyboard and display drivers are loaded so that the user can click a preferred sound option as described above. Enablement of such APP 148 type code may be prompted by a flag (set bit) in a non-volatile memory (such as BIOS) within the computer.

It should be understood that at least some aspects of the present invention may alternatively be implemented in a computer-readable medium that contains a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore, that such signal-bearing media, when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Figure 4A:
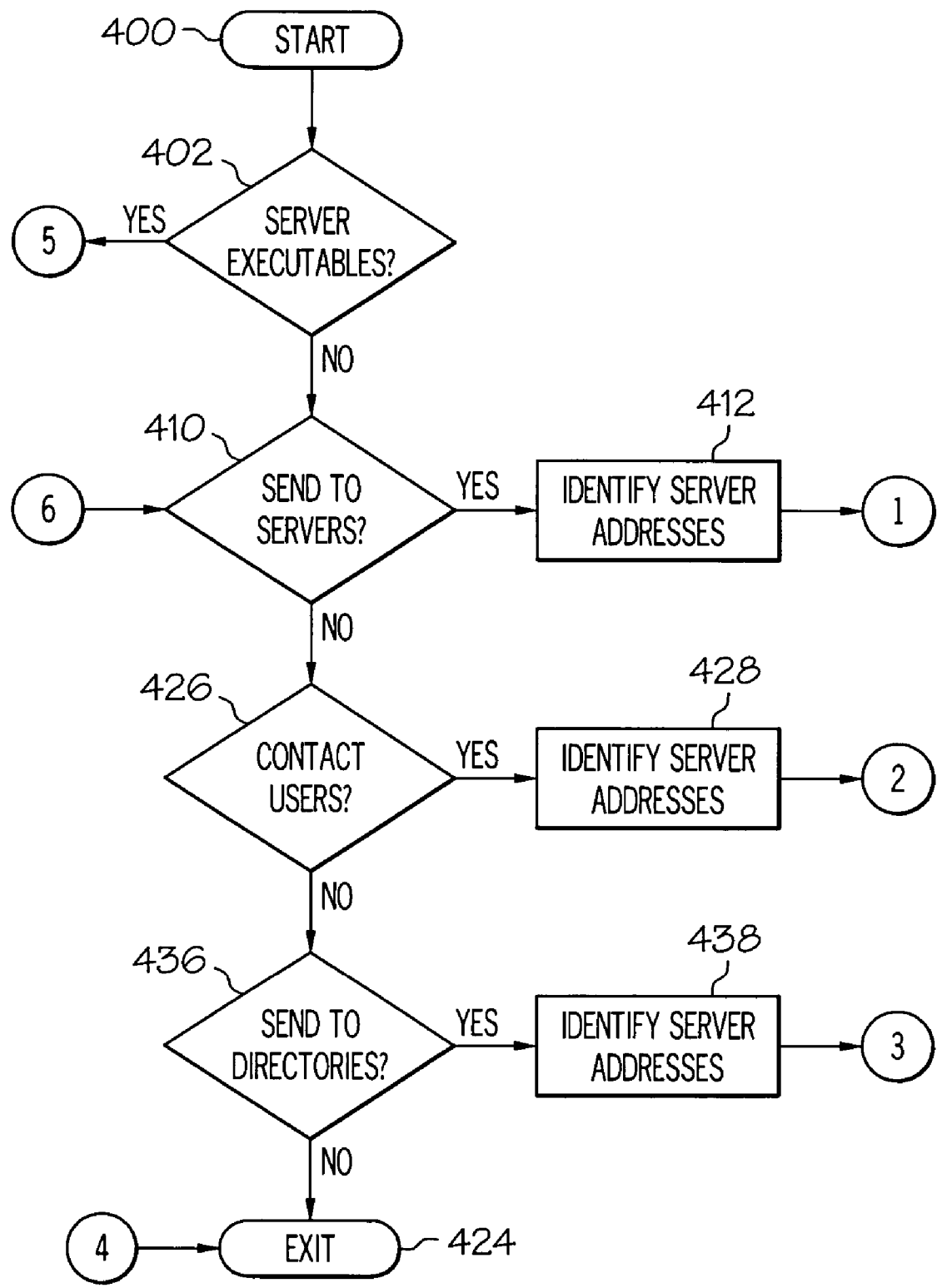
FIGS. 4a-b show a flow-chart of steps taken to deploy software capable of executing the steps shown and described in FIGS. 3a-b.
Figure 4B:
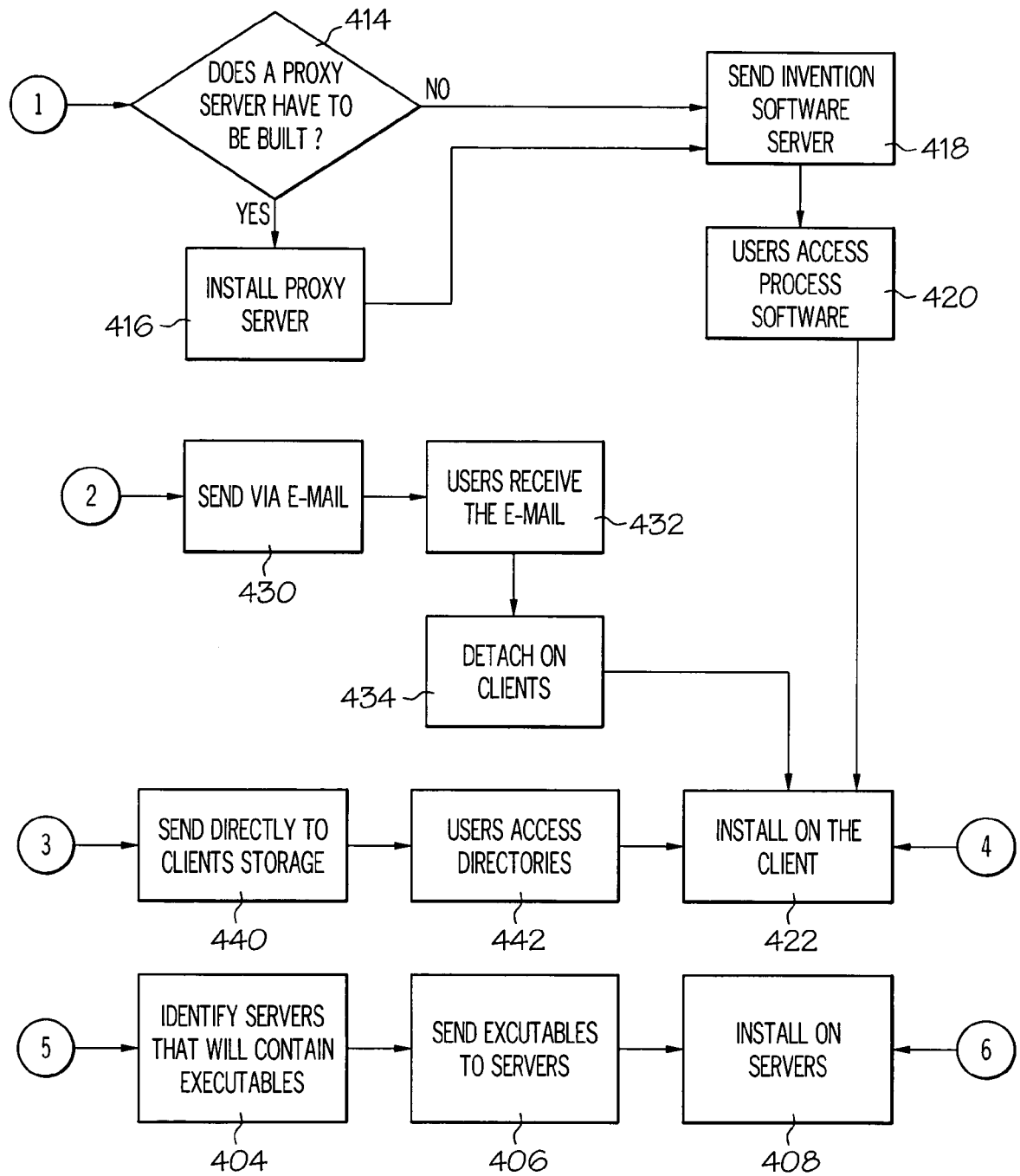

Thus, the method described herein, and in particular as shown and described in FIGS. 3a-b, can be deployed as a process software from service provider server 202 to client computer 102 and/or target computer 129. Referring then to FIG. 4, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made on whether to the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 5A:
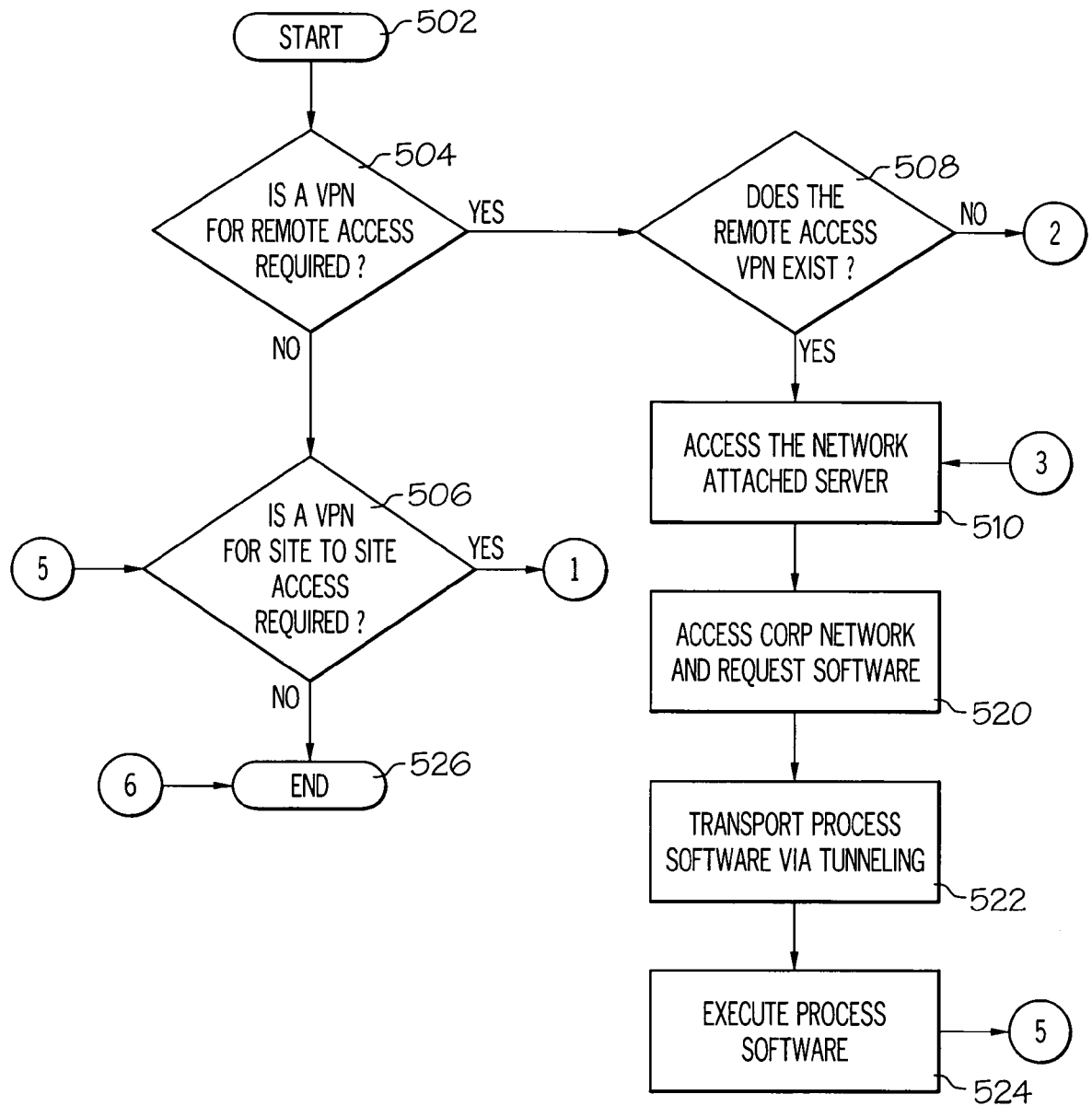
FIGS. 5a-c show a flow-chart of steps taken to deploy in a Virtual Private Network (VPN) software that is capable of executing the steps shown and described in FIGS. 3a-b.
Figure 5B:
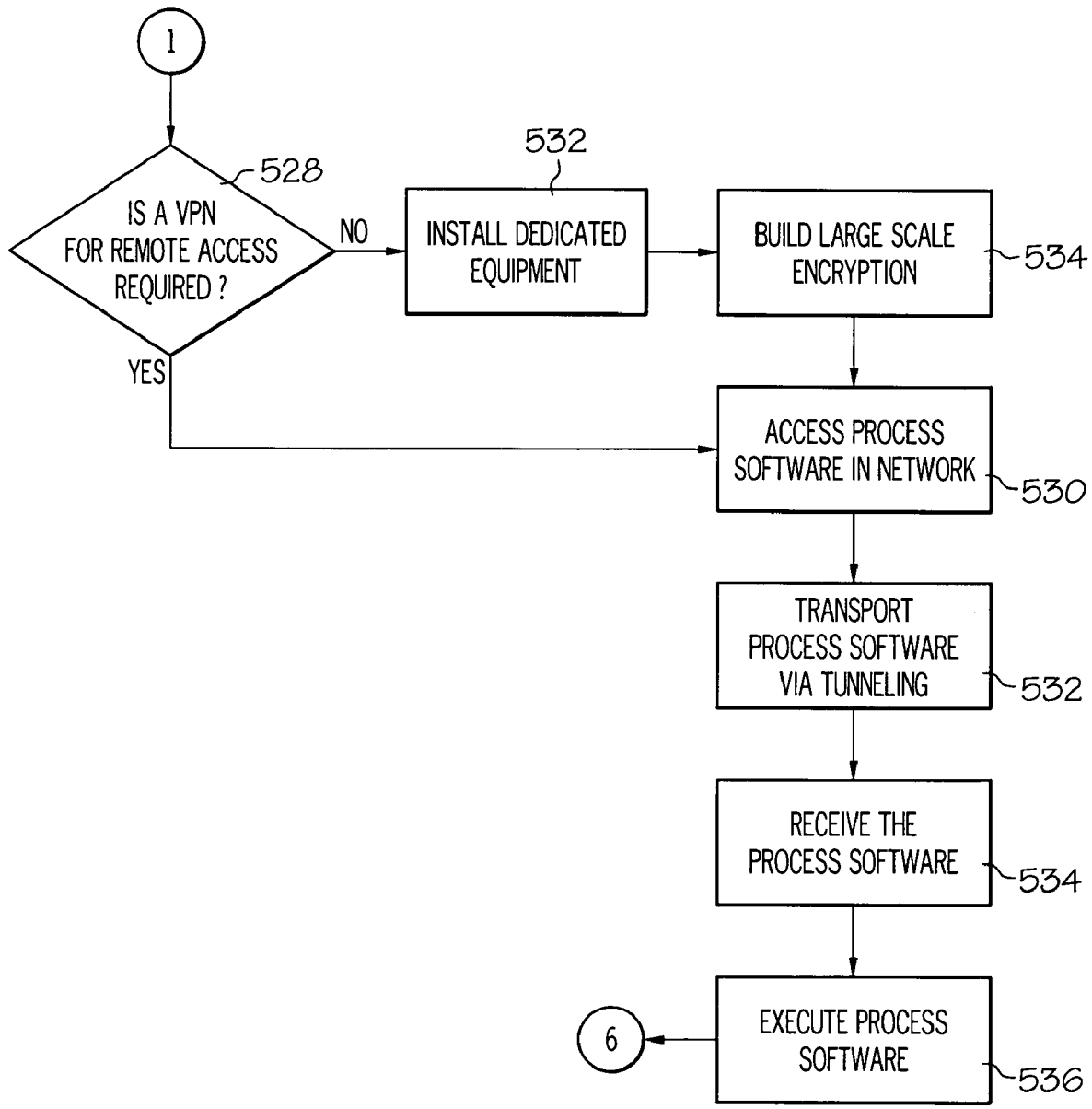
Figure 5C:
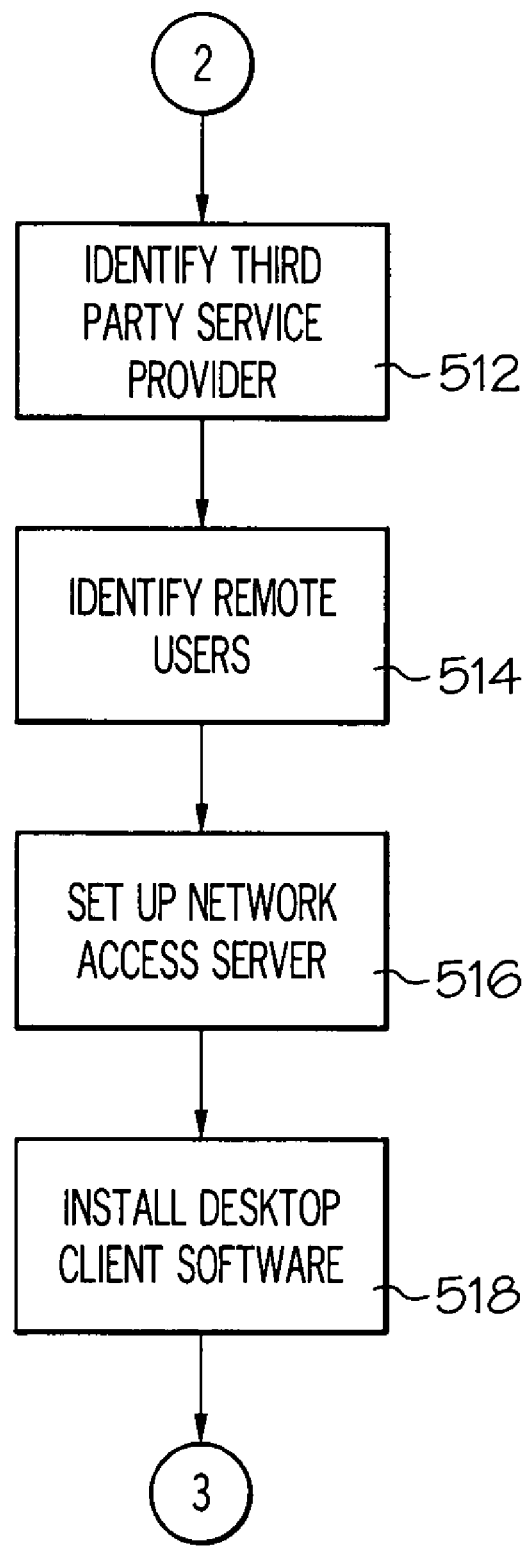

The process for such VPN deployment is described in FIG. 5. Initiator block 502 begins the Virtual Private Network (VPN) process. A determination is made to see if a VPN for remote access is required (query block 504). If it is not required, then proceed to (query block 506). If it is required, then determine if the remote access VPN exists (query block 508).

If a VPN does exist, then proceed to block 510. Otherwise identify a third party provider that will provide the secure, encrypted connections between the company's private network and the company's remote users (block 512). The company's remote users are identified (block 514). The third party provider then sets up a network access server (NAS) (block 516) that allows the remote users to dial a toll free number or attach directly via a broadband modem to access, download and install the desktop client software for the remote-access VPN (block 518).

After the remote access VPN has been built or if it been previously installed, the remote users can access the process software by dialing into the NAS or attaching directly via a cable or DSL modem into the NAS (block 510). This allows entry into the corporate network where the process software is accessed (block 520). The process software is transported to the remote user's desktop over the network via tunneling. That is the process software is divided into packets and each packet including the data and protocol is placed within another packet (block 522). When the process software arrives at the remote user's desk-top, it is removed from the packets, reconstituted and then is executed on the remote users desk-top (block 524).

A determination is then made to see if a VPN for site to site access is required (query block 506). If it is not required, then proceed to exit the process (terminator block 526). Otherwise, determine if the site to site VPN exists (query block 528). If it does exist, then proceed to block 530. Otherwise, install the dedicated equipment required to establish a site to site VPN (block 532). Then build the large scale encryption into the VPN (block 534).

After the site to site VPN has been built or if it had been previously established, the users access the process software via the VPN (block 530). The process software is transported to the site users over the network via tunneling (block 532). That is the process software is divided into packets and each packet including the data and protocol is placed within another packet (block 534). When the process software arrives at the remote user's desktop, it is removed from the packets, reconstituted and is executed on the site users desktop (block 536). The process then ends at terminator block 526.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6A:
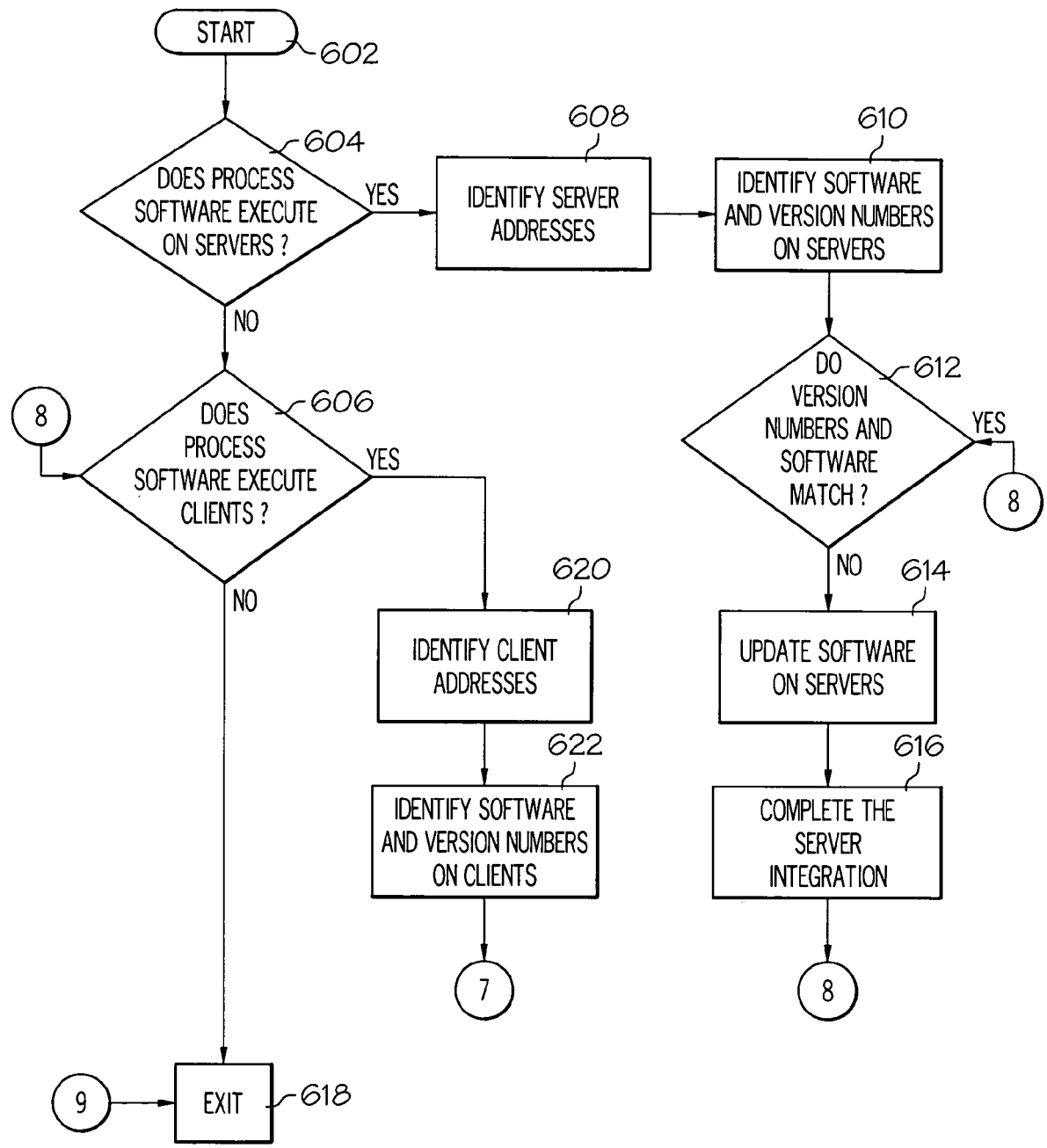
FIGS. 6a-b show a flow-chart showing steps taken to integrate into an computer system software that is capable of executing the steps shown and described in FIGS. 3a-b.
Figure 6B:
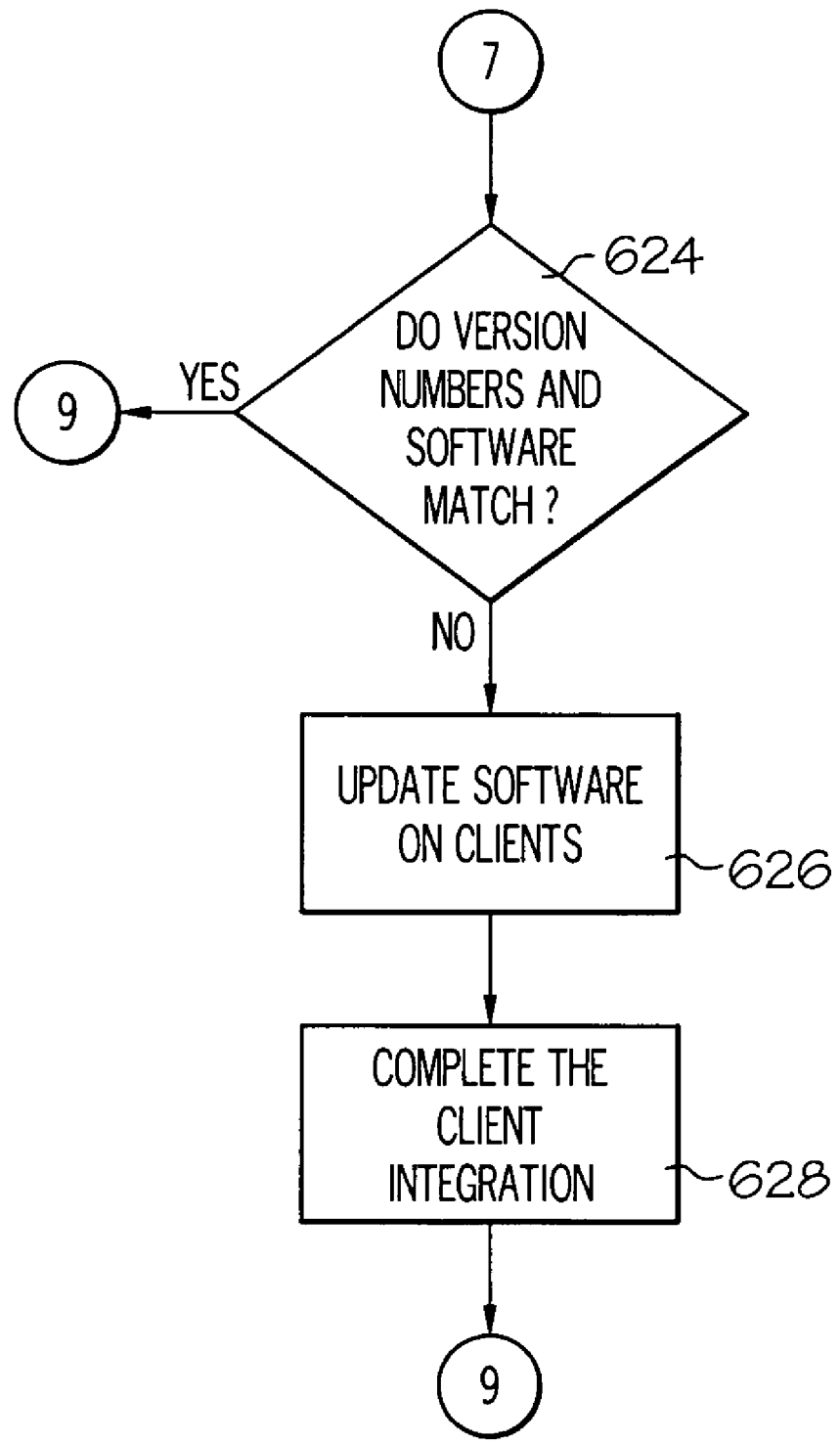

For a high-level description of this process, reference is now made to FIG. 6. Initiator block 602 begins the integration of the process software. The first tiling is to determine if there are any process software programs that will execute on a server or servers (block 604). If this is not the case, then integration proceeds to query block 606. If this is the case, then the server addresses are identified (block 608). The servers are checked to see if they contain software that includes the operating system (OS), applications, and network operating systems (NOS), together with their version numbers, which have been tested with the process software (block 610).

The servers are also checked to determine if there is any missing software that is required by the process software in block 610.

A determination is made if the version numbers match the version numbers of OS, applications and NOS that have been tested with the process software (block 612). If all of the versions match and there is no missing required software the integration continues in query block 606.

If one or more of the version numbers do not match, then the unmatched versions are updated on the server or servers with the correct versions (block 614). Additionally, if there is missing required software, then it is updated on the server or servers in the step shown in block 614. The server integration is completed by installing the process software (block 616).

The step shown in query block 606, which follows either the steps shown in block 604, 612 or 616 determines if there are any programs of the process software that will execute on the clients. If no process software programs execute on the clients the integration proceeds to terminator block 618 and exits. If this not the case, then the client addresses are identified as shown in block 620.

The clients are checked to see if they contain software that includes the operating system (OS), applications, and network operating systems (NOS), together with their version numbers, which have been tested with the process software (block 622). The clients are also checked to determine if there is any missing software that is required by the process software in the step described by block 622.

A determination is made is the version numbers match the version numbers of OS, applications and NOS that have been tested with the process software (query block 624). If all of the versions match and there is no missing required software, then the integration proceeds to terminator block 618 and exits.

If one or more of the version numbers do not match, then the unmatched versions are updated on the clients with the correct versions (block 626). In addition, if there is missing required software then it is updated on the clients (also block 626). The client integration is completed by installing the process software on the clients (block 628). The integration proceeds to terminator block 618 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
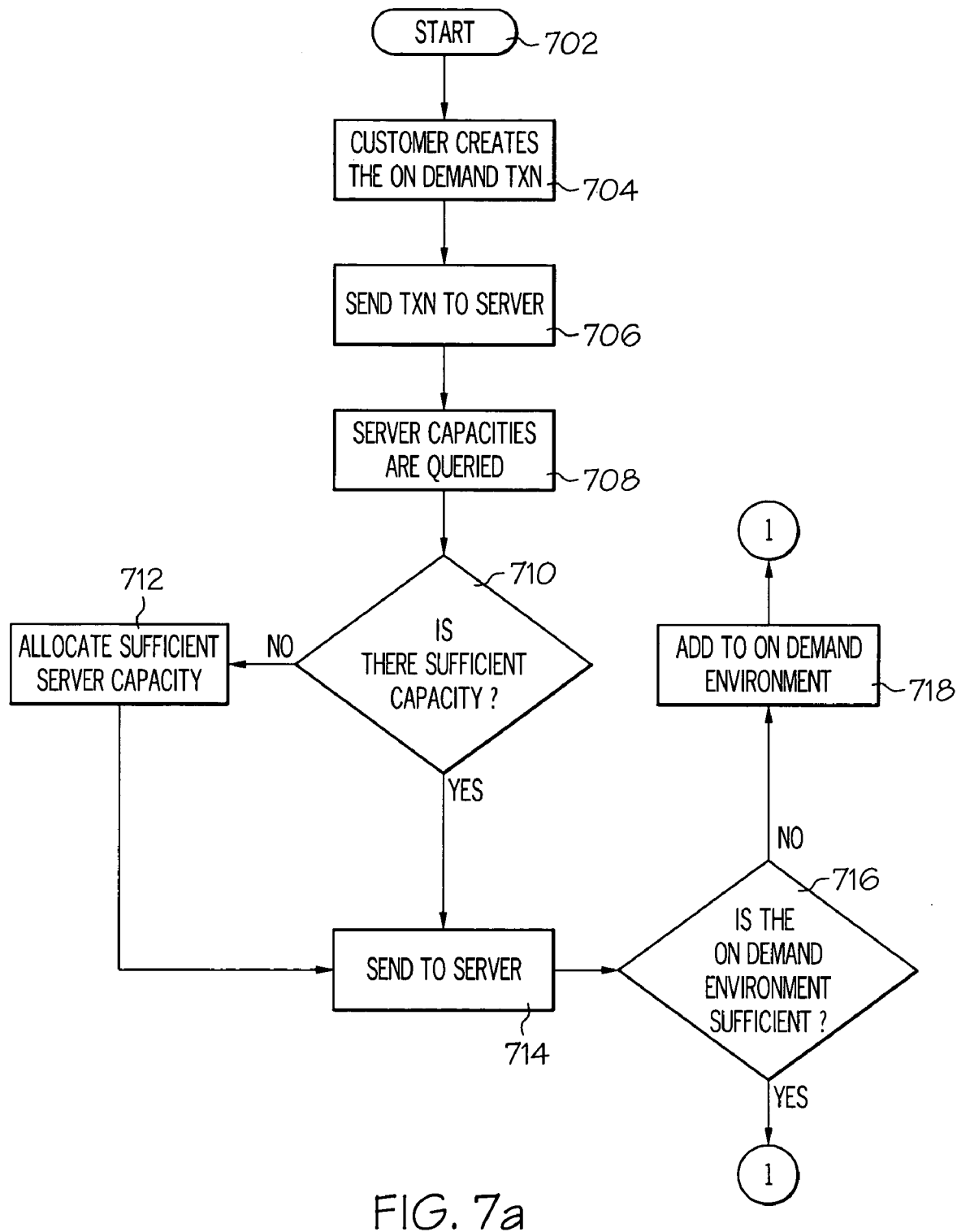
FIGS. 7a-b show a flow-chart showing steps taken to execute the steps shown and described in FIGS. 3a-b using an on-demand service provider.
Figure 7B:
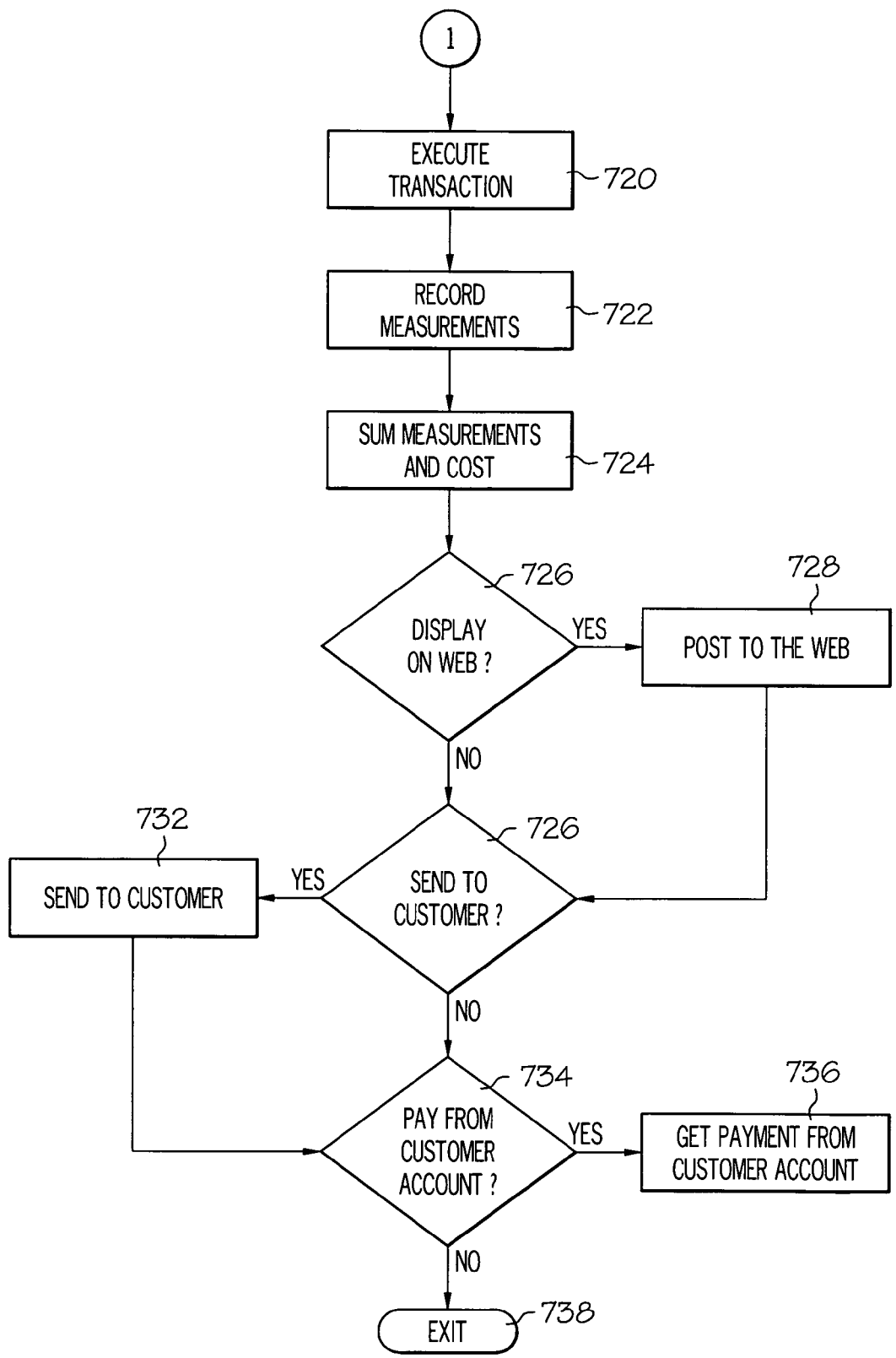

With reference now to FIG. 7, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit-(CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient Available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:

transmitting, from a transmitting computer to a receiving computing device, three options to accept a message from the transmitting computer, wherein the message includes a text component and an audio content;

transmitting, from the transmitting computer to the receiving computing device, an instruction that cause the receiving computer device to present, on a video display at the receiving computing device, a first option, a second option, and a third option for accepting the message, wherein the first option is to accept the message at the receiving computing device with the audio content attached and fully enabled for activation upon receipt of the message, wherein the second option is to accept both the text component and the audio content of the message but to contemporaneously and temporarily disable the audio content by disabling a sound card on the receiving computing device upon receipt of the message, and wherein the third option is to accept only the text component of the message while rejecting a receipt of the audio content;

receiving, by the transmitting computer, a instruction indicating which of the three options has been selected by a user of the receiving computing device for receiving the message;

in response to the user selecting the first option:
   transmitting the message from the transmitting computer to the receiving computing device with the audio content attached to the message, and
   activating the audio content immediately upon the receiving computing device receiving the message;

in response to the user selecting the second option:
   transmitting the message from the transmitting computer to the receiving computing device with the audio content attached to the message, and
   remotely and temporarily disabling, by the remote transmitting computer, the audio content at the receiving computing device by temporarily disabling the sound card on the receiving computing device; and in response to the user selecting the third option:
   transmitting the message from the transmitting computer to the receiving computing device without the audio content attached to the message.

2. The computer-implemented method of claim 1, wherein the audio content is embedded directly into the message.

3. The computer-implemented method of claim 1, wherein the audio content is an audio file that is stored in the remote transmitting computer.

4. The computer-implemented method of claim 1, wherein the audio content is a streaming content.

5. The computer-implemented method of claim 4, wherein the streaming content is generated by a streaming media source point.

6. The computer-implemented method of claim 1, wherein the user has selected the second option, and wherein the sound card is re-activated only after a volume level on the receiving computing device is adjusted downward.

7. The computer-implemented method of claim 1, wherein the user has selected the second option, and wherein the sound card is re-activated only after the user plugs a set of headphones into the receiving computing device.

8. The computer-implemented method of claim 1, wherein the user has selected the third option, and wherein the computer-implemented method further comprises subsequently reoffering the first option and the second option to the user of the receiving computing device in response to the user selecting the third option.

9. The computer-implemented method of claim 1, wherein the user has selected the third option, and wherein the receiving computing device is permanently prevented from aurally presenting the audio content unless the user subsequently selects the first option or the second option.

10. A system comprising:

a processor;
a data bus coupled to the processor;
a memory coupled to the data bus; and
a computer-usable medium embodying computer program code, the computer program code comprising instructions stored in a tangible medium and executable by the processor and configured to:

transmit, from a remote transmitting computer to a receiving computing device, three options to accept an Instant Messaging (IM) message from the remote transmitting computer, wherein the IM message includes a text component and an audio streaming content, wherein a first option is to receive the IM message at the receiving computing device with the audio streaming content attached and fully enabled, wherein a second option is to receive the IM message with the audio streaming content attached but to contemporaneously and temporarily disable the audio streaming content upon receipt of the IM message, and wherein a third option is to receive the IM message without the audio streaming content being attached;

receive, by the remote transmitting compute, a instruction indicating which of the three options has been selected by a user of the receiving computing device for receiving the IM message;

in response to the user selecting the first option:
   transmit the IM message to the receiving computing device with the audio streaming content attached to the IM message, and
   activate the audio streaming content immediately upon the receiving computing device receiving the IM message;

in response to the user selecting the second option:
   transmit the IM message to the receiving computing device with the audio streaming content attached to the IM message;
   remotely and temporarily disable, by the remote transmitting computer, the audio streaming content at the receiving computing device by temporarily disabling a sound card on the receiving computing device, and subsequently reactivate the audio streaming content in response to the user plugging headphones into the receiving computing device to disable loudspeakers on the receiving computing device; and in response to the user selecting the third option:

transmit the IM message without the audio streaming content attached to the IM message, and subsequently reoffer the first and second option to the user of the receiving computing device.

11. A tangible computer-usable storage medium on which is stored computer program code, the computer program code comprising computer executable instructions configured to:

transmit, from a remote transmitting computer to a receiving computing device, three options to accept an Instant Messaging (IM) message from the remote transmitting computer, wherein the IM message includes a text component and an audio streaming content, wherein a first option is to receive the IM message at the receiving computing device with the audio streaming content attached and fully enabled, wherein a second option is to receive the IM message with the audio streaming content attached but to contemporaneously and temporarily disable the audio streaming content upon receipt of the IM message, and wherein a third option is to receive the IM message without the audio streaming content being attached;

receive, by the remote transmitting computer, a instruction indicating which of the three options has been selected by a user of the receiving computing device for receiving the IM message;

in response to the user selecting the first option:

transmit the IM message to the receiving computing device with the audio streaming content attached to the IM message, and activate the audio streaming content immediately upon the receiving computing device receiving the IM message;

in response to the user selecting the second option:

transmit the IM message to the receiving computing device with the audio streaming content attached to the IM message;

remotely and temporarily disable, by the remote transmitting computer, the audio streaming content at the receiving computing device by temporarily disabling a sound card on the receiving computing device, and subsequently reactivate the audio streaming content in response to the user plugging headphones into the receiving computing device to disable loudspeakers on the receiving computing device; and in response to the user selecting the third option:

transmit the IM message without the audio streaming content attached to the IM message, and subsequently reoffer the first and second option to the user of the receiving computing device.

* * * * *